(12) United States Patent
Su et al.

(10) Patent No.: US 6,784,941 B1
(45) Date of Patent: Aug. 31, 2004

(54) DIGITAL CAMERA WITH VIDEO INPUT

(75) Inventors: Te-Sung Su, Hsinchu (TW);
Jiann-Jong Tsai, YungKang (TW)

(73) Assignee: Sunplus Technology Co., Ltd. (TW)

( * ) Notice: Subject to any disclaimer, the term of this patent is extended or adjusted under 35 U.S.C. 154(b) by 772 days.

(21) Appl. No.: 09/634,914

(22) Filed: Aug. 9, 2000

(51) Int. Cl.[7] .......................... H04N 11/20; H04N 7/01
(52) U.S. Cl. ...................... 348/445; 348/441; 348/454; 348/581; 348/582; 348/207.1
(58) Field of Search ................................ 348/441, 445, 348/454, 581, 582, 71, 207.1, 207.11

(56) References Cited

U.S. PATENT DOCUMENTS

| | | | | |
|---|---|---|---|---|
| 4,739,395 A | * | 4/1988 | Johanndeiter et al. | 348/628 |
| 5,712,687 A | * | 1/1998 | Naveen et al. | 348/453 |
| 5,805,214 A | * | 9/1998 | Nishizawa et al. | 348/231.8 |
| 5,960,154 A | * | 9/1999 | Ohnishi et al. | 386/117 |
| 6,151,067 A | * | 11/2000 | Suemoto et al. | 348/207.99 |
| 6,237,106 B1 | * | 5/2001 | Koyama et al. | 713/502 |
| 6,583,809 B1 | * | 6/2003 | Fujiwara | 348/14.12 |
| 6,611,286 B1 | * | 8/2003 | Terasawa et al. | 348/220.1 |
| 6,614,489 B1 | * | 9/2003 | McIntyre | 348/708 |
| 6,642,962 B1 | * | 11/2003 | Lin et al. | 348/252 |

* cited by examiner

*Primary Examiner*—Andrew Christensen
*Assistant Examiner*—Brian Genco
(74) *Attorney, Agent, or Firm*—Lowe Hauptman Gilman & Berner, LLP

(57) ABSTRACT

A digital camera with video input is disclosed. An image sensor is provided to capture an image and convert the captured image into R/G/B image signals the are processed by a video signal processing unit for being converted into pixel data having a first format. A TV decoder converts input analog video signals into pixel data having a second format. A scaling unit performs aspect ratio processing and zoom/pan function to pixel data. A TV interface unit converts pixel data having the second format into pixel data having the first format for being selectively output to the scaling unit directly and output to the scaling unit after transferring to the video signal processing unit for performing edge enhancement. A compressing and storage unit performs compress operation to the pixel data output from the video signal processing unit and the scaling unit. An USB unit converts pixel data after being compressed into serial data for output.

14 Claims, 4 Drawing Sheets

DIGITAL CAMERA WITH VIDEO INPUT

BACKGROUND OF THE INVENTION

1. Field of the Invention

The present invention relates to the field of digital cameras, and especially to a digital camera capable of receiving video input.

2. Description of Related Art

With the progress of digital image technology, the conventional cameras are gradually replaced by digital cameras. The image data captured by a digital camera is generally transferred to a personal computer and other data processing devices for being further processed, stored, or printed. Therefore, by the digitized image-capture function of the digital camera and the data processing ability of the personal computer, the applications of the digital image technology are more and more popular in the daily life. For example, the photographs captured by a digital camera can be stored in a personal computer without using any heavy photograph books. Moreover, the photographs stored in a personal computer can be processed or added with multimedia effect.

Other than receiving a picture from a digital camera, the personal computer can also receive video signals from a TV, a recorder, a CD drive, a DVD drive, and other video signal generating devices for being stored, edited, or being played on a display device, so as to enhance the diversity of multimedia applications.

However, if there is a need to input the picture of a digital camera and the video signals of a video signal generating device to a personal computer, it is necessary to have both a digital camera and a video interface device. This is not only wasted in hardware, but also is inconvenient in the multimedia application since image and video data are necessary to be input from different devices. Therefore, there is a desire to have a novel digital camera, such that image and video data can be input thereto for multimedia application, with only a little hardware resource.

SUMMARY OF THE INVENTION

Accordingly, the primary object of the present invention is to provide a digital camera with video input for integrating hardware resources and enabling the application of multimedia to be more convenient.

To achieve the object, the digital camera with video input in accordance with the present invention includes an image sensor, a video signal processing unit, a TV decoder, a scaling unit, a TV interface unit, a compressing and storage unit, and an USB unit. The image sensor is provided for capturing an external image and converting the captured image into R/G/B image signals. The video signal processing unit is provided for receiving the R/G/B image signals generated by the image sensor, and converting the received signals into pixel data having a first format for output. The TV decoder is provided for converting input external analog video signals into pixel data having a second format. The scaling unit is provided for performing aspect ratio processing and zoom/pan function to pixel data. The TV interface unit is provided to convert pixel data having the second format into pixel data having the first format for being selectively output to the scaling unit directly and output to the scaling unit after transferring to the video signal processing unit for performing edge enhancement. The compressing and storage unit is provided for performing compress operation to the pixel data output from the video signal processing unit and the scaling unit. The USB unit is provided for converting pixel data after being compressed into serial data for output.

The various objects and advantages of the present invention will be more readily understood from the following detailed description when reading in conjunction with the appended drawing.

DETAILED DESCRIPTION OF THE PREFERRED EMBODIMENT

Figure 1:
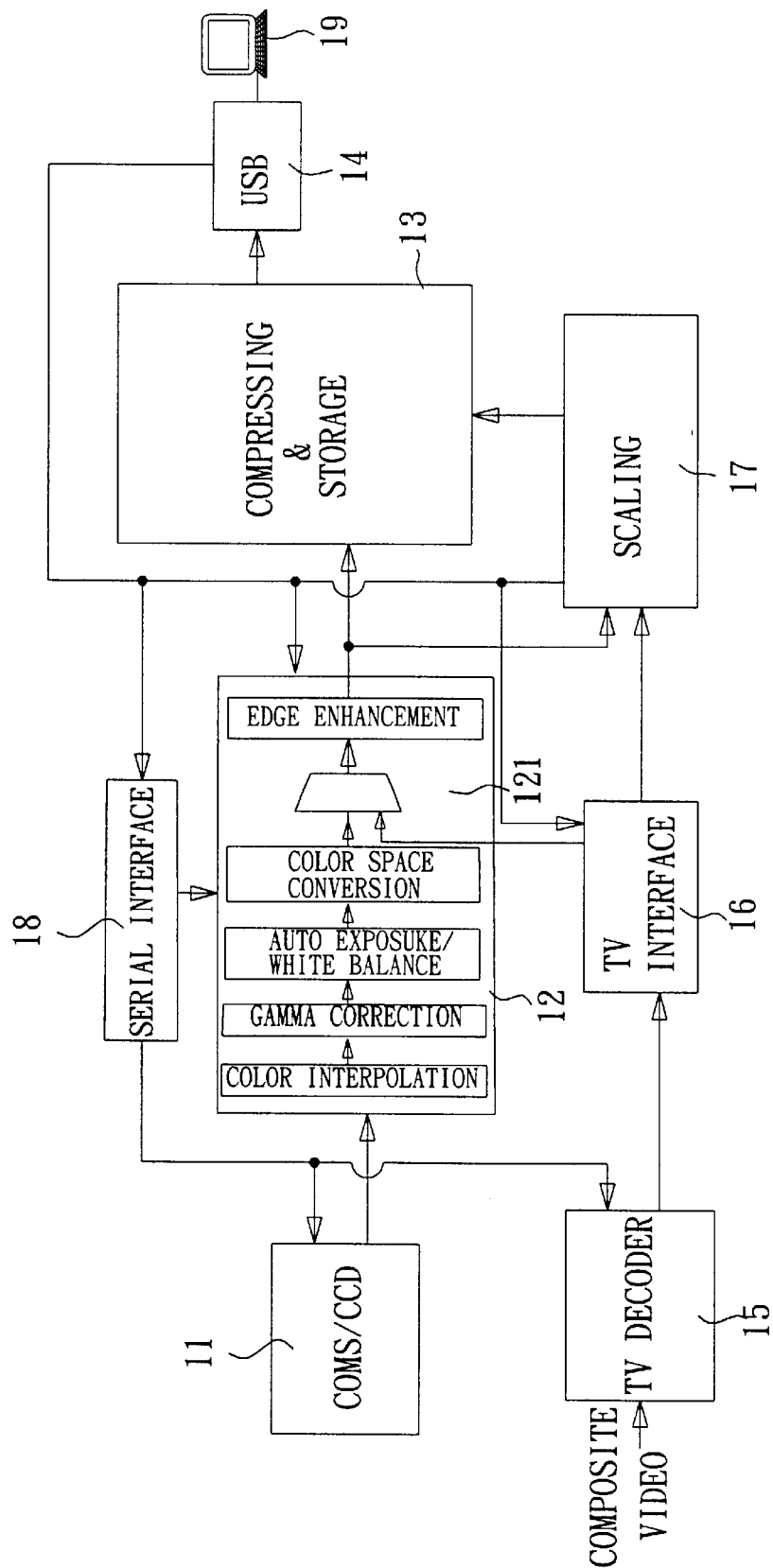
FIG. 1 is a functional block diagram of the digital camera with video input in accordance with the present invention.

With reference to FIG. 1, a preferred embodiment of the digital camera with video input in accordance with the present invention is illustrated. The digital camera of the present invention captures external images through an image sensor 11. Preferably, the image sensor 11 is a CMOS sensor, or it can be a CCD module formed by a CCD (charge coupled device) sensor, a correlation double sampling (CDS) device, an automatic gain control (AGC) device, and an analog to digital (A/D) converter, for converting the sensed image into R/ G/ B (red / green / blue) image data.

The image sensor 11 outputs the R/G/B image data to a video signal processing (VSP) unit 12 that implements color interpolation, gamma correction, automatic exposure/white balance, color space conversion and edge enhancement, so as to generate pixel data of Y/U/V 4:4:4 format which is thus compressed by an compressing and storage unit 13. The compressed data is converted by an USB unit 14 into serial data that is further transferred to a personal computer 19 for being processed and displayed.

The composite video signals from TV, VCR, VCD or DVD are converted into pixel data of BT 601/656 Y/U/V format by a TV decoder, and then are converted by a TV interface unit 16 into pixel data of Y/U/V 4:4:4 format for being processing further. The Y/U/V 4:4:4 pixel data can be output to a scaling unit 17 or to the video signal processing unit 12 for being processed by edge enhancement under the selection of the multiplexer 121. The output data after being processed by edge enhancement is applied to the scaling unit 17. The scaling unit performs aspect ratio processing and zoom/pan function. Finally, the processed pixel data from the scaling unit 17 is also transferred to the compressing and storage unit 13 for being compressed, and the compressed data is converted into serial data by the USB unit 14 to be transferred to a personal computer for being processed and displayed.

Other than receiving serial data from the USB unit 14 for being further processed and displayed, the personal computer 19 is able to set the video signal processing unit 12, compressing and storage unit 13, TV interface unit 16 and scaling unit 17 through the USB unit 14. Furthermore, the personal computer 19 can program the digital camera through a serial interface unit 18 for controlling the speed of the shuttle of the image sensor 11, format of the TV decoder 15, contrast, illumination, and hue, and further detecting whether the TV decoder 15 is connected to the video generating device.

Figure 2:
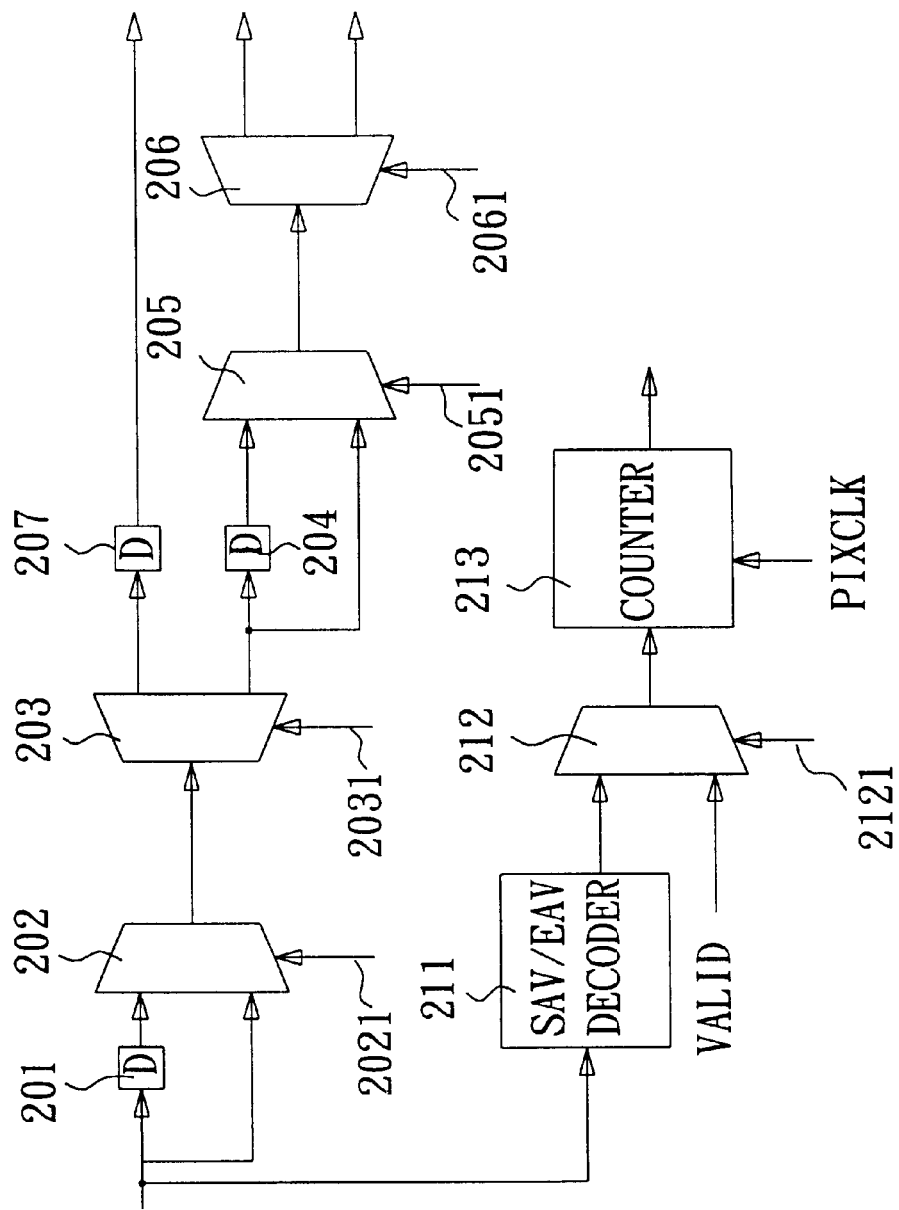
FIG. 2 schematically illustrates the circuit structure of the TV interface unit shown in FIG. 1.

The detail structure of the TV interface unit 16 is illustrated in FIG. 2. The pixel data generated by the TV decoder 15 may be an 8/16-bit BT601/656 Y/U/V format. As such, if the pixel data input from the video signal processing unit 12 is of an 8-bit Y/U/V format, and the pixel data is generated at a speed of PIXCLK×2, where PIXCLK represents the pixel clock, there are four possible transfer orders provided as follows:

Y0→U1→Y2→V3      (a)

Y0→V1→Y2→U3      (b)

U0→Y1→V2→Y3      (c)

V0→Y1→U2→Y3      (d)

wherein the pixel data transferred in the format of (c) or (d) is delayed through a time period of PIXCLK×2 via a delay element 201. The delayed pixel data is applied to an input end of a multiplexer 202. The pixel data transferred in the format of (a) or (b) is applied to the other input end of the multiplexer 202. As such, the multiplexer 202 can select the desired data format based on the control line 2021. Therefore, the pixel data generated by the multiplexer 202 have a fixed format; i.e., the Y data is always the starting pixel.

The pixel data with a fixed format is then applied to a demultiplexer 203. The demultiplexer 203 is controlled by a PIXCLK signal on the control line 2031. Therefore, the input pixel data can be partitioned into two 8-bit data buses, each having a data speed of PIXCLK. One of the data buses is used to transfer Y data in an order of Y0, Y1, Y2, Y3. . . , and the other one is used to transfer U/V data with two possible orders as the following:

U0→V1→U2→V3      (e)

V0→U1→V2→U3      (f)

wherein the U/V data transferred in the (f) format is delayed through a time period of PIXCLK by a delay element 204. The delayed U/V data and the U/V data transferred in the (e) format are transferred to a multiplexer 205 for selecting the desired data format according to the control line 2051. Therefore, the U/V data generated by the multiplexer 205 is always initiated with U data. The U/V data is further input to a demultiplexer 206 that is controlled by a PIXCLK/2 signal on the control line 2061. As a result, the U/V data can be partitioned into two data buses. One is used to transfer U data, while the other one is used to transfer V data. In addition, the Y data output from the demultiplexer 203 is delayed by a delay element 207 for compensating the time for processing the U/V data, and the Y data is then output. Thus, the data conversion is completed and data with the Y/U/V 4:4:4 format is output.

Furthermore, the pixel data input to the TV interface unit 16 may be of a 16-bit Y/U/V format. Because the resultant data format is equivalent to that generated by the demultiplexer 203, it is only required to bypass the processing of the delay element 201, multiplexer 202 and demultiplexer 203, so as to achieve the same data conversion function.

Besides, the TV decoder 15 may further provide a VALID signal for defining the active image area. In the BT601 format, the valid signal is an individual signal. In the BT656 format, the valid signal is embedded in the data bus. That is, in the BT656 format, a SAV (start of active video) code is provided to define the start active pixel of an image, and an EAV (end of active video) code is provided to define the end active pixel of the image. Therefore, the pixel data from the data bus must be decoded by a SAV/EAV decoder 211 for generating a VALID signal of BT656. Then, according to the employed format, a multiplexer 212 is provided to select the VALID signal of BT601 or BT656 based on its control line 2121. The VALID signal is input to a counter 213 that is operating at a speed of PIXCLK, so as to drive the counter 213 to start to count when the VALID signal is active and to stop counting when the counting reaches a predetermined value, for example 720, and output a VALID signal. Accordingly, it can be assured that a VALID signal is output for every 720 pixels so that the problem of the incorrect timing about the VALID signal due to fast forward or backward operation of the external video playing device can be avoided.

Figure 3:
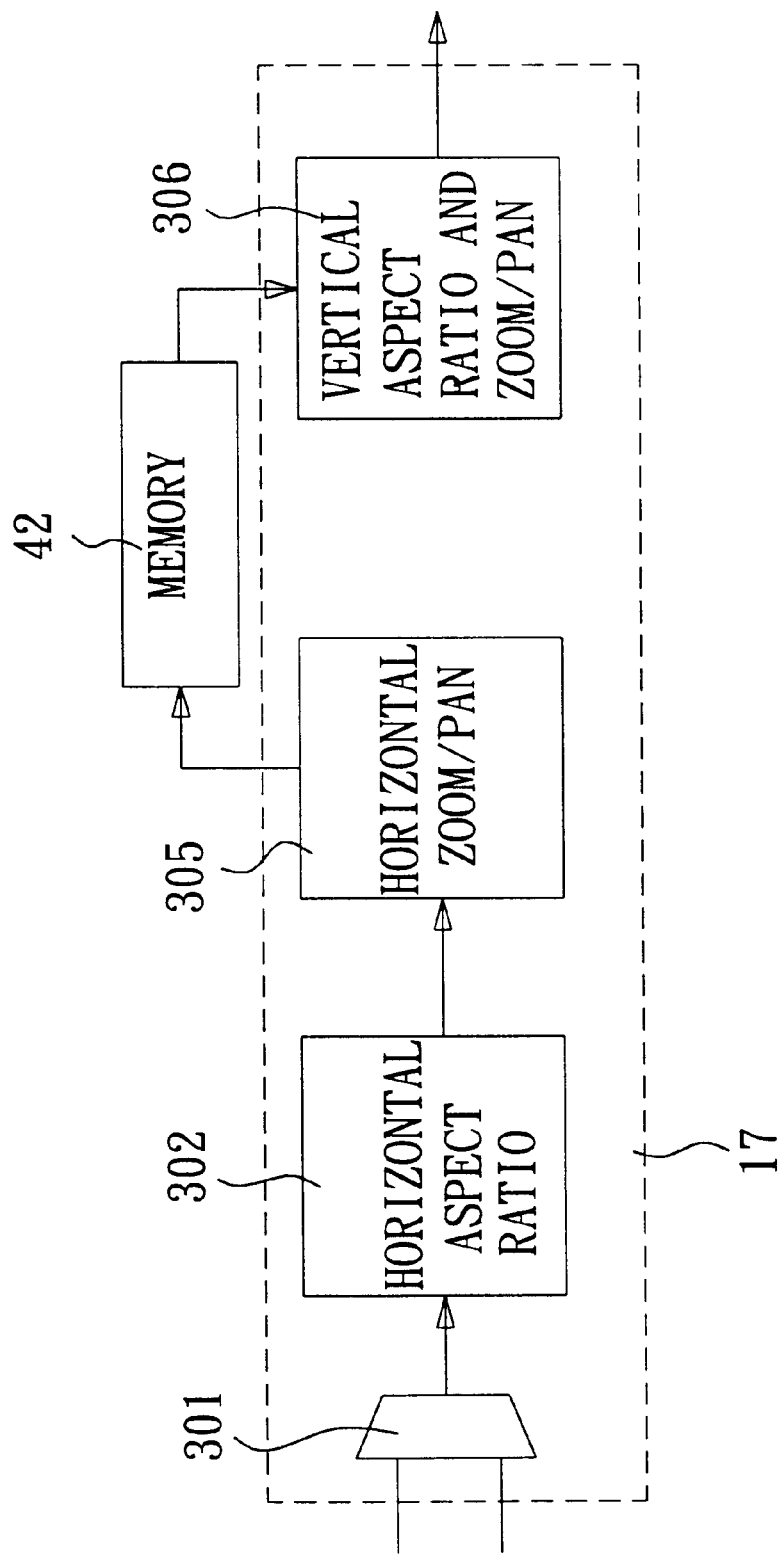
FIG. 3 schematically illustrates the circuit structure of the scaling unit shown in FIG. 1.

The structure of the scaling unit 17 is illustrated in FIG. 3, wherein, a multiplexer 301 is provided to select the data output from the TV interface unit 16 or the video signal processing unit 12. The selected data of Y/U/V 4:4:4 format is first processed by a horizontal aspect ratio unit 302 for transferring 720 active pixels per line to 640 active pixels by using linear interpolation and resample technique. Next, the data are processed by a horizontal zoom/pan unit 305, such that the image can be zoomed or panned in a 320×240 mode. The horizontally zoomed or panned data is stored in the memory 42 of the compressing and storage unit 13, and finally is processed by a vertical aspect ratio and zoom/pan unit 306 for transferring 576 lines per frame to 480 lines using linear interpolation and resample technique when the PAL system is used. At the same time, the vertically zoom/pan operation is also processed.

Figure 4:
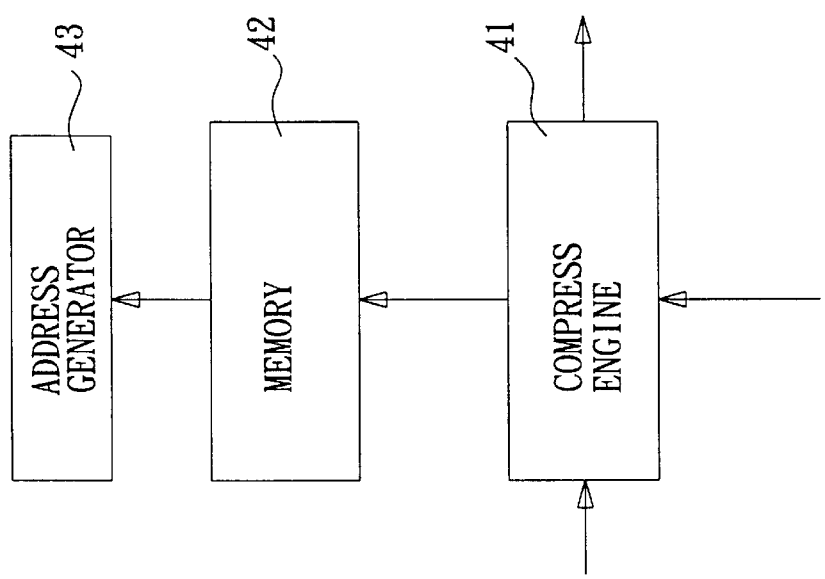
FIG. 4 schematically illustrates the circuit structure of the compressing and storage unit shown in FIG. 1.

The structure of the compressing and storage unit 13 is illustrated in FIG. 4, which includes a compress engine 41 and a memory 42 for performing a compress operation to the input pixel data. The compressed data is output via the USB unit 14. In details, if the data input to the compressing and storage unit 13 is from the video signal processing unit 12, under the control of an address generator 43, the data compressed by the compress engine 41 is written into the memory 42 sequentially, and is sequentially read for output. If the data input to the compressing and storage unit 13 is from the scaling unit 17, the data can be processed in a field mode or a frame mode under the control the address generator 43. In the field mode, only data of one of the odd field and even field of a frame is sequentially written into the memory 42, and when the data is read out, an interpolation operation is performed in the vertical direction for compensating the lost data. In the frame mode, data of even field is written sequentially into the even lines of the memory 42, and data of odd field is written sequentially into the odd lines of the memory 42. Consequently, data can be simply read from the memory 42 sequentially.

In view of the forgoing, it is appreciated that the present invention has effectively integrated the hardware of the digital camera and video interface device. Moreover, by using the serial interface unit 18 to detect status of the TV decoder 15, it can determine whether the digital camera is connected to a video playing device, and thus the USB unit 14 is able to set the digital camera for receiving the video signals from the video playing device or receiving the image signals captured by the image sensor 11. That is, when connecting with a video playing device, the digital camera is provided to process the video signals from the video playing device, and when not connecting a video playing device, the digital camera is provided to process the data captured by the image sensor 11. Therefore, there is only one device required to input, for example, both the picture of a photograph and video data of a video playing device, to a personal computer, such that not only the hardware resource is saved, but also the multimedia application becomes more flexible and convenient.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A digital camera with video input, comprising:
    an image sensor for capturing an external image and converting the captured image into R/G/B image signals;
    a video signal processing unit for receiving the R/G/B image signals generated by the image sensor, and converting the received signals into pixel data having a first format for output;
    a TV decoder for converting input external analog video signals into pixel data having a second format;
    a scaling unit for providing aspect ratio processing and zoom/pan function to pixel data;
    a TV interface unit to convert pixel data having the second format into pixel data having the first format for being selectively output to the scaling unit directly and output to the scaling unit after transferring to the video signal processing unit for performing edge enhancement, wherein the TV interface unit further has:
        a first delay element for selectively delaying input pixel data with a time period of PIXCLK×2, where pixel is generated in a speed of PIXCLK×2 and PIXCLK represents pixel clock;
        a first multiplexer to select one of the input pixel data and the pixel data delayed by the first delay element for output;
        a first demultiplexer controlled by PIXCLK signal on a control line for partitioning the pixel data from the first multiplexer into Y data and U/V data;
        a second delay element for optionally delaying the U/V data with a time period of PIXCLK;
        a second multiplexer to select one of the U/V data from the first demultiplexer and the U/V data delayed by the second delay element for output;
        a second demultiplexer controlled by PIXCLK/2 signal on a control line for partitioning the U/V data from the second multiplexer into U data and V data; and
        a third delay element to delay the Y data from the first demultiplexer for output so as to compensate a time for processing the U/V data;
    a compressing and storage unit for performing compress operation to the pixel data output from the video signal processing unit and the scaling unit; and
    an USB unit for converting pixel data after being compressed into serial data for output.

2. The digital camera with video input as claimed in claim 1, wherein the first format is Y/U/V 4:4:4 format.

3. The digital camera with video input as claimed in claim 1, wherein the second format is BT601/656 Y/U/V format.

4. The digital camera with video input as claimed in claim 1, wherein the image sensor is a CMOS sensor.

5. The digital camera with video input as claimed in claim 1, wherein the image sensor is a CCD module.

6. The digital camera with video input as claimed in claim 1, wherein the video signal processing unit performs color interpolation, gamma correction, automatic exposure/white balance, color space conversion, and edge enhancement for the input R/G/B image data.

7. The digital camera with video input as claimed in claim 1, wherein the USB unit transfers the converted serial data to a computer for being processed and displayed.

8. The digital camera with video input as claimed in claim 7, wherein the computer is able to set the video signal processing unit, the compressing and storage unit, the TV interface unit and the scaling unit through the USB unit.

9. The digital camera with video input as claimed in claim 8, further comprising a serial interface unit which is controlled by the USB unit for programming shuttle speed of the image sensor, format of the TV decoder, contrast, illumination, and hue, and detecting whether the TV decoder is connected to a video playing device.

10. The digital camera with video input as claimed in claim 1, wherein the TV interface unit further comprises:
    a decoder for producing a valid signal from the input pixel data;
    a third multiplexer to select one of the valid signal provided by the TV decoder or the valid signal produced by the decoder for output; and
    a counter driven by the valid signal from the third multiplexer to start to count when the valid signal is active, and output a valid signal when reaching a predetermined value.

11. The digital camera with video input as claimed in claim 1, wherein pixel data input to the scaling unit is processed by a horizontal aspect ratio unit, a horizontal zoom/pan unit, and a vertical aspect ratio and zoom/pan unit.

12. The digital camera with video input as claimed in claim 1, wherein the compressing and storage unit comprises:
    a memory, and
    a compress engine for operating with the memory to compress the input pixel data.

13. The digital camera with video input as claimed in claim 12, wherein the compressing and storage unit further comprises an address generator for controlling the memory in such a manner that, if data input to the compressing and storage unit is from the video signal processing unit, the data which is compressed by the compress engine is sequentially written to the memory sequentially read from the memory for output.

14. The digital camera with video input as claimed in claim 13, wherein, if data input to the compressing and storage unit is from the scaling unit, the address generator processes the data selectively under a field mode and a frame mode, in such a manner that, in the field mode, only data of one field of a frame is sequentially written into the memory and an interpolation operation is performed for compensating lost data when the data is read out, and in the frame mode, data of even field is written sequentially into even lines of the memory and data of odd field is written sequentially into odd lines of the memory such that data can be simply read from the memory sequentially.

* * * * *